(12) United States Patent
Gilly et al.

(10) Patent No.: US 7,100,995 B2
(45) Date of Patent: Sep. 5, 2006

(54) WHEEL SPINNER ASSEMBLY

(75) Inventors: Stuart Gilly, Baton Rouge, LA (US); Lee Haynes, Baton Rouge, LA (US); Gary Casemore, Baton Rouge, LA (US)

(73) Assignee: GLS Wheels, L.L.C., Baton Rouge, LA (US)

( * ) Notice: Subject to any disclaimer, the term of this patent is extended or adjusted under 35 U.S.C. 154(b) by 0 days.

(21) Appl. No.: 10/657,396

(22) Filed: Sep. 8, 2003

(65) Prior Publication Data
US 2005/0052069 A1   Mar. 10, 2005

(51) Int. Cl.
B60B 7/04   (2006.01)
(52) U.S. Cl. .................................................. 301/37.25
(58) Field of Classification Search ........... 301/37.101, 301/37.105, 37.23, 37.102, 108.1, 111.3, 301/37.25, 31.37; 40/587, 591
See application file for complete search history.

(56) References Cited

U.S. PATENT DOCUMENTS

| | | | | |
|---|---|---|---|---|
| 2,780,939 A | * | 2/1957 | Kellogg | 73/458 |
| 3,005,906 A | * | 10/1961 | Butler, Jr. | 362/500 |
| 3,499,330 A | * | 3/1970 | Bjorn et al. | 73/458 |
| 4,775,919 A | * | 10/1988 | Pearsall et al. | 362/500 |
| 4,929,030 A | * | 5/1990 | Park | 301/37.25 |
| 5,188,428 A | | 2/1993 | Carter, III | |
| 5,659,989 A | | 8/1997 | Hsiao et al. | |
| 5,931,543 A | | 8/1999 | Smith | |
| 6,070,947 A | | 6/2000 | Hoyle, Jr. | |
| 6,116,763 A | | 9/2000 | King | |
| 6,322,237 B1 | | 11/2001 | Lee | |
| 6,464,303 B1 | | 10/2002 | Stembridge | |
| 6,554,370 B1 | | 4/2003 | Fowlkes | |
| 6,633,187 B1 | * | 12/2003 | Fitzgerald | 301/37.25 |
| 6,663,187 B1 | * | 12/2003 | Fitzgerald | 301/37.25 |
| 2005/0093363 A1 | * | 5/2005 | Necaise | 301/37.25 |
| 2005/0121968 A1 | * | 6/2005 | McCaster et al. | 301/37.25 |
| 2005/0146203 A1 | * | 7/2005 | Lin | 301/37.25 |

* cited by examiner

*Primary Examiner*—Frantz F. Jules
(74) *Attorney, Agent, or Firm*—Jones, Walker, Waechter, Poitevent, Carrere & Denegre, L.L.P.

(57) ABSTRACT

A wheel spinner for mounting on a rim of a vehicle wheel and enhance ornamental features of a tire. Direct current motors cause rotation of the spinner independently from rotation of the tires. A user operates a remote control for sending a sending to the drive motors to regulate the speed and direction of rotation of the spinner independently from the tire rotation. A cover plate secures the spinner to the rim of the vehicle wheel.

19 Claims, 2 Drawing Sheets

WHEEL SPINNER ASSEMBLY

BACKGROUND OF THE INVENTION

This invention relates to automotive wheel covers, and more particularly to a wheel cover provided with a spinner assembly that rotates at a speed different from the rotating wheel.

Wheel covers and outer surfaces of the wheel are used for providing additional ornamentation to an automobile. For instance, many car wheels are provided with decorative nuts that may have a particular color or lighting capabilities to enhance the ornamental features. The nuts may have a contrasting color or illumination, which is highly visible against the background of an otherwise dark wheel assembly.

Many automobile enthusiasts mount special wheel cover assemblies that have weights secured thereon to prevent rotation of the wheel cover as the automobile wheel rotates. Such covers may have advertising indicia imprinted thereon or special graphics to distinguish the car and attract attention to the advertising. Other known devices use an air current for stabilizing the display portion of the disk of the wheel cover to retain the disk stationary and to allow the display of graphics on the disk. Still others provide illumination assemblies that are mounted on the side of the wheels to enhance the aesthetic effect of a rotating tire and make it highly visible during nighttime. Still other known modifications include the use of decorative attachments for the tire rims that are painted with reflective paint to enhance visibility of the automobile and provide an additional ornamental feature to the vehicle.

Most of the known devices are attached to the wheel to rotate at the same speed as the wheel while enhancing the decorative features of the wheel. The present invention contemplates provision of a wheel spinner assembly that is adapted for mounting on a conventional tire rim and is adapted for rotation at speeds and directions of rotation different from the speed and direction of rotation of the vehicle wheel.

SUMMARY OF THE INVENTION

It is therefore, an object of the present invention to provide a wheel spinner assembly adapted for attachment to conventional tire rims for rotation at a speed and direction different from rotation of the tire.

It is another object of the present invention to provide a wheel spinner assembly for rotation at speeds remotely selected by the user.

These and other objects of the present invention are achieved through a provision of a wheel spinner assembly mountable on a rim of a vehicle wheel and driven by independent motors, which form a part of the spinner assembly. The drive motors are direct current motors powered by a battery pack and controlled by a remote transmitter. A receiver operationally connected to the drive motors allows to selectively modify the speed and direction of rotation of the spinner assembly. The drive motors and the battery pack are mounted on each wheel of a vehicle.

The spinner assembly comprises an ornamental spinner member that may be configured with spokes having stepped up ridges to increase the decorative effect. The spinner spokes extend from a central hub that receives a bearing assembly therein to facilitate rotation of the spinner member.

A cover plate secured to the spinner member through a ring gear mounts the spinner member on the rim of a vehicle wheel.

When the drive motors are activated by a remote handheld device the drive motors cause the spinner member to rotate at a speed different from the speed of rotation of the vehicle wheels, or in a direction opposite to the direction of rotation of the vehicle wheel. If desired, the spinner member may be caused to remain stationary while the vehicle wheels rotate in a moving vehicle.

BRIEF DESCRIPTION OF THE DRAWINGS

Reference will now be made to the drawings, wherein like parts are designated by like numerals and wherein.

DETAILED DESCRIPTION OF THE PREFERRED EMBODIMENT

Figure 1:
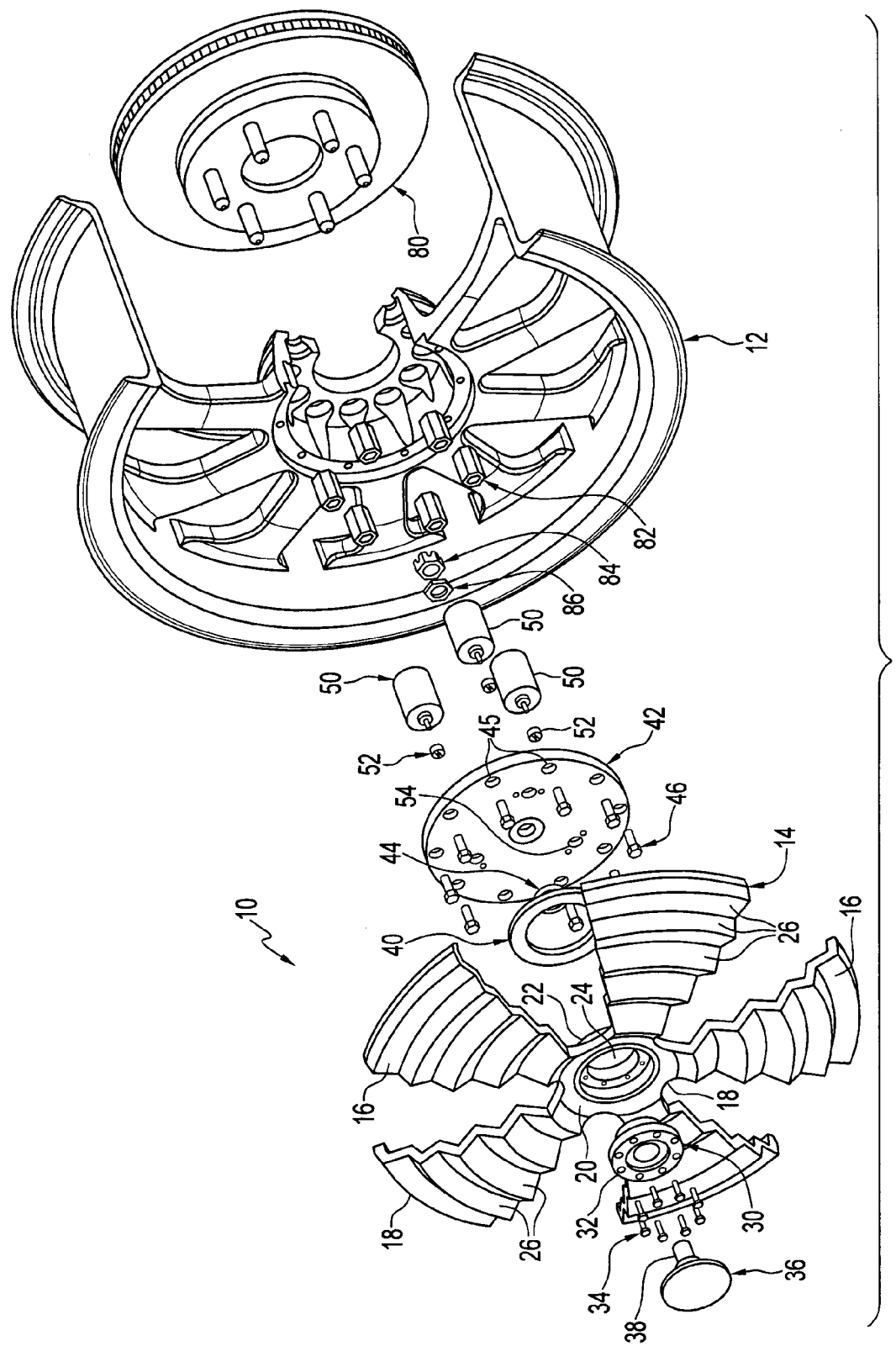
FIG. 1 is an exploded view of the spinner assembly adapted for securing on a conventional rim of a tire.

Turning now to the drawings in more detail, numeral 10 designates the wheel spinner assembly in accordance with the present invention. As shown in the drawing, the wheel spinner assembly 10 is adapted for mounting onto a rim 12 of a wheel (not shown) of a car or truck. The spinner assembly 10 comprises an ornamental spinner member 14 that has a plurality of spokes 16 radially extending from a central hub 18. The shape and size of the spokes may differ.

The spinner member 14 illustrated in FIG. 1 has each spoke of a generally segmental shape, with linear dimensions of the outer edge of the spoke being greater than the linear dimension of the inner portion of the spoke. The spokes 16 may be formed from cast aluminum, polished and chrome plated, if desired. A plurality of step-up ridges 26 may be formed on each of the spokes 16 to enhance the visual attractiveness of the spinner assembly. The spokes 16 are unitary formed with the central hub 18. The hub 18 has an outer rim 20, an inner extension 22, and a central opening 24.

A spinner bearing assembly 30 is adapted for positioning in the hub 20 to extend in the central opening 24. The bearing assembly 30 comprises angular contact bearings that have sufficient sealing and lubrication to provide free rotation of the spinner member 14 independent of the rim 12. An enlarged diameter flange 32 of the bearing assembly 30 allows engagement by lugs or screws 34 for securing of the bearing assembly 30 to the spinner member 14.

A cap 36 is provided for securing the spinner member to the outer rim 20. The cap 36 is a fixed element that rotates with rotation of the rim 12, at the same speed as the rim 12. A post 38 of the cap 36 extends through the bearing assembly 30 and central opening 24 for attachment to the rim 12 of the vehicle wheel (not shown).

Mounted between the spinner member 14 and the rim 12 is a ring gear 40, which fits over the inner portion 22 of the spinner assembly 14. A cover plate 42 is mounted between the ring gear 40 and the rim 12. A spacer 44 may be provided between the gear ring 40 and the cover plate 42.

The cover plate 42 is flat circular member formed with a plurality of through openings 45, each sized and shaped to receive a cap screw 46 therethrough. The cap screws 46 secure the cover plate 42 to the rim 12. The cover plate 42 may be a modified conventional cover plate or wheel replacement cover plate specifically adapted for use with the spinner assembly 10.

A plurality of direct current motors 50 are positioned between the rim 12 and the cover plate 42. The motors 50 control rotation of the spinner member 14 at the speed selected by the user, as will be explained in more detail hereinafter. Each motor 50 is provided with a suitable pinion 52 for driving the ring gear 40. The drive pinions 52 extend through openings 54 formed in the cover plate 42 and contact the ring gear 40. The rotation from the motor 50 is transmitted through the pinion 52, ring gear 40, and then to the spinner member 14 causing its rotation independent of the rim 12.

Figure 2A:
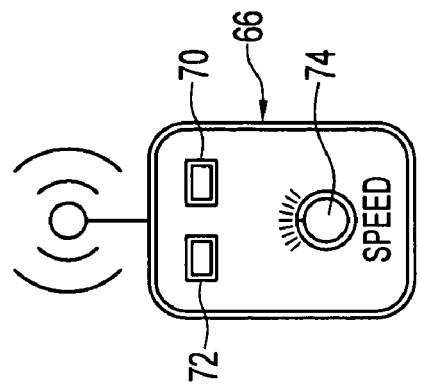
FIGS. 2 and 2A are schematic views illustrating a remote control assembly for controlling operation of drive motors.
Figure 2:
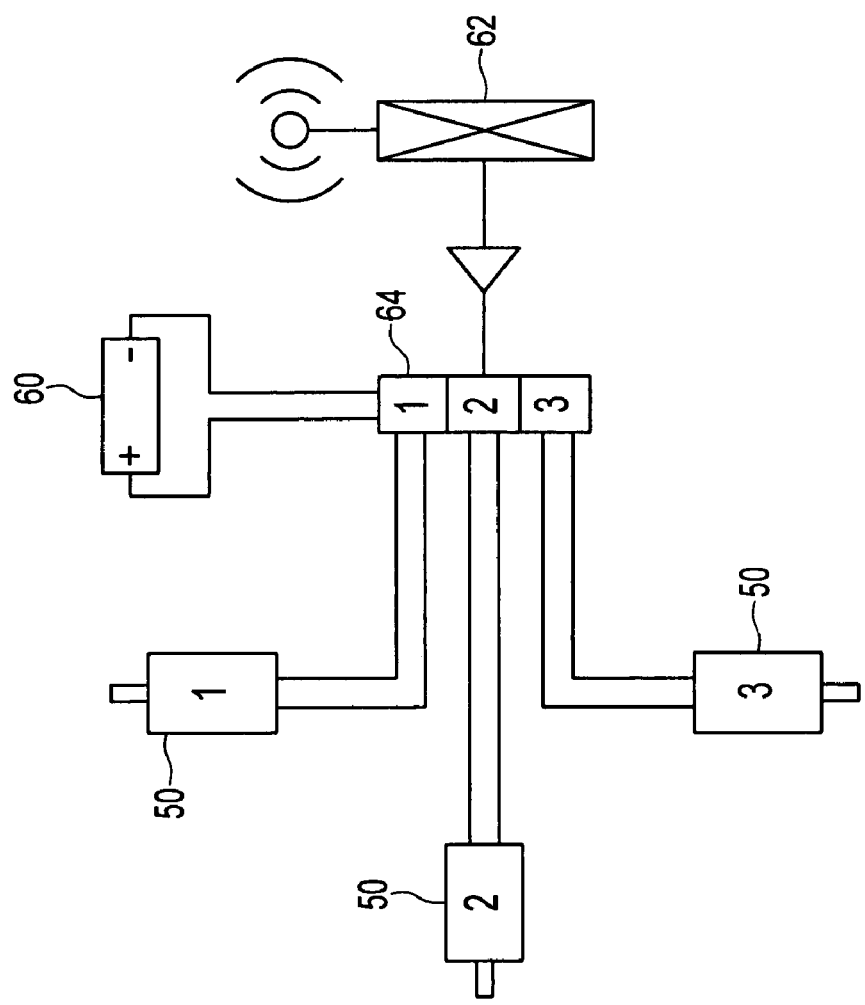

A battery pack 60 (FIG. 2) provides power to the motors 50, directing the spinner member 14 to remain stationary, to rotate after vehicle has stopped or to rotate at a speed different from the rotation of the wheel, or even rotate in a direction opposite from the wheel rotation, as selected by the user. The motors 50 are connected to a receiver 62, which is operationally connected through a driver 64 to each motor 50.

The receiver 62 receives signals from a hand-held remote transmitter 66 (FIG. 2A) which has three control buttons: a control button 70 directing the spinner assembly to rotate in the direction reverse from the direction of the wheel; a control knob 72 sending a signal to cause the spinner member 14 to rotate in the same direction as the wheel; and a speed control button 74, which controls the speed of rotational force transmitted from the motors 50 to the spinner member 14.

The tire rim 12 is provided with conventional brake rotor 80, a plurality of lug nuts 82, each lug nut being provided with a castle nut 84 and a lug washer 86.

In operation, the spinner member 14, being mounted on a wheel rotating bearing assembly 32 can rotate independently in relation to the rotation of the wheel. Due to the centrifugal force, the residual friction of the bearing assembly 32 may continue rotation of the spinner 14 even after the vehicle has stopped. At the same time, when activated by the user, the drive motors 50 cause the spinner member 14 to rotate in a direction reverse from the rotation of the wheel, providing an eye catching decorative addition to the wheel.

Since each wheel has an independent battery pack 60 and independent motor driver 64 controlling operation of the direct current motors 50, the user may accelerate the speed of rotation of the spinner member 14, or decrease the speed of rotation of the spinner so that even after the automobile has stopped, the spinner member 14 continues its rotation powered by the battery 60 and driven by the motors 50.

It is envisioned that rotational speed of the spinner member 14 may be timed with square wave output from the anti-lock brake system of the wheel speed sensor. It is also possible to provide the effect of a motionless spinner member 14 on a moving car. It is also envisioned that an illumination assembly may be provided for illuminating the outside of the spinner member 14, while being connected to the same battery pack 60. In the alternative, the light assembly may be mounted directly on the wheel to be powered by the battery pack 60 and fixedly attached to the rim to prevent rotation when the vehicle is not in motion.

It is further envisioned that the motorized spinners may be connected to operate in conjunction with the car security system in an attempt to draw attention to the vehicle in the event of vandalism or attempted theft. Electrical connections when the car is motionless may help replenish electrical power to the batteries at each wheel. It is further envisioned that a full time brushed connection for direct power application to each wheel may be provided.

Many other changes and modifications may be made in the design of the present invention without departing from the spirit thereof. We therefore pray that our rights to the present invention be limited only by the scope of the appended claims.

We claim:

1. A wheel spinner assembly adapted for mounting on a rim of a vehicle wheel, the assembly comprising:
   a spinner assembly comprising drive motors for imparting rotational force on the spinner assembly independently from the vehicle wheel;
   a means for mounting the spinner assembly on the rim of the vehicle wheel; and
   a means for remotely controlling operation of said drive motors.

2. The wheel spinner assembly of claim 1, wherein said drive motors control direction and speed of rotation of the spinner assembly.

3. The wheel spinner assembly of claim 1, further comprising a spinner member provided with a plurality of spokes extending radially from a central hub.

4. The wheel spinner assembly of claim 3, wherein each of said spokes has a stepped-up configuration.

5. The wheel spinner assembly of claim 3, wherein said mounting means comprises a bearing assembly engaging the hub of the spinner member, a ring gear engaging the spinner member on an opposite side from said bearing assembly and a cover plate mounted between the ring gear and the rim of the vehicle wheel and detachably attached to the rim of the vehicle wheel.

6. The wheel spinner assembly of claim 5, wherein each of said drive motors is provided with a drive pinion, each of said pinions extending through the cover plate.

7. A wheel spinner assembly adapted for mounting on a rim of a vehicle wheel, the assembly comprising:
   a spinner assembly comprising drive motors for imparting rotational force on the spinner assembly independently from the vehicle wheel;
   a means for mounting the spinner assembly on the rim of the vehicle wheel; and
   a power source for operating said drive motors.

8. The wheel spinner assembly of claim 7, wherein said power source is a battery pack operationally connecting said drive motors to a remote control device.

9. A wheel spinner assembly adapted for mounting on a rim of a vehicle wheel, the assembly comprising:
   a spinner assembly comprising drive motors for imparting rotational force on the spinner assembly independently from the vehicle wheel; and
   a means for mounting the spinner assembly on the rim of the vehicle wheel, said mounting means comprising a cover plate detachably securable to the rim of the vehicle wheel and supporting the drive motors mounted between the cover plate and the rim of the vehicle wheel.

10. The wheel spinner assembly of claim 9, said drive motors control direction and speed of rotation of the spinner assembly.

11. The wheel spinner assembly of claim 9, further comprising a remote control device for selectively modifying direction and speed of rotation of the spinner assembly.

12. The wheel spinner assembly of claim 9, wherein said spinner assembly comprises a spinner member detachably securable on a side of the cover plate opposite the drive motors.

13. The wheel spinner assembly of claim 12, wherein said spinner member comprises a plurality of spokes extending radially from a central hub, each of said spokes having generally segmental configuration with an outmost edge having, greater linear dimension than an inner edge secured to the hub.

14. The wheel spinner assembly of claim 12, further comprising a means for remotely controlling operation of said drive motors.

15. The wheel spinner assembly of claim 14, wherein said remote control means comprises a remote transmitter and a receiver mounted for an operational connection with the drive motors, said transmitter sending a signal for selecting speed and direction of rotation of the spinner member.

16. A wheel spinner assembly adapted for mounting on a rim of a vehicle wheel, the assembly comprising:
   a spinner assembly comprising drive motors for imparting rotational force on the spinner assembly independently from the vehicle wheel;
   a means for mounting the spinner assembly on the rim of the vehicle wheel; and
   a means for controlling direction and speed of rotation of the spinner assembly, said control means being operationally connected to said drive motors.

17. The wheel spinner assembly of claim 16, wherein said spinner assembly comprises a spinner member provided with a plurality of spokes extending radially from a central hub.

18. The wheel spinner assembly of claim 17, wherein mounting means comprises a bearing assembly engaging the hub of the spinner member, a ring gear engaging the spinner member on an opposite side from said bearing assembly and a cover plate mounted between the ring gear and the rim of the vehicle wheel and detachably mountable on the rim of the vehicle wheel.

19. The wheel spinner assembly of claim 16, wherein means for controlling direction and rotation of the spinner assembly comprises a remote transmitter and a receiver mounted for an operational connection with the drive motors, said transmitter sending a signal for selecting speed and direction of rotation of the spinner assembly.

* * * * *